P. H. CHASE.
ELECTRIC SWITCH.
APPLICATION FILED FEB. 28, 1916.

1,352,400.

Patented Sept. 7, 1920.
3 SHEETS—SHEET 1.

WITNESSES:
AJBrunger
L. C. Reardon

INVENTOR
Philip H. Chase.
BY
Delos G. Haynes
ATTORNEY

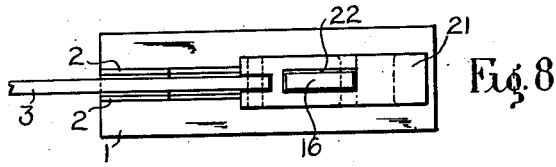
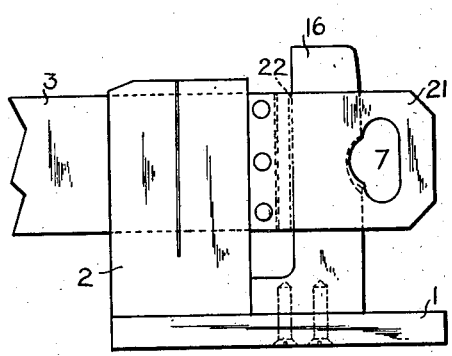
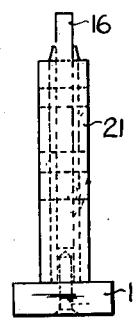
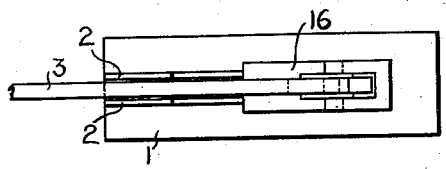
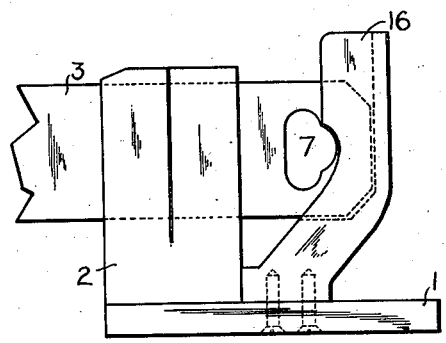
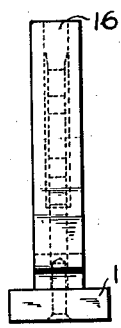

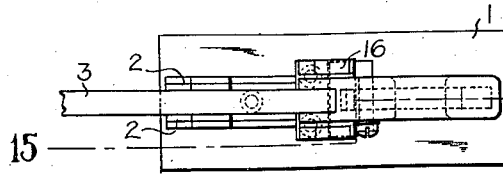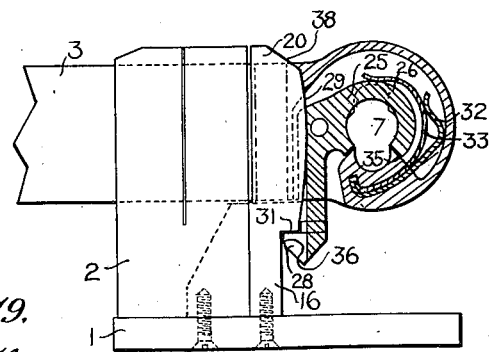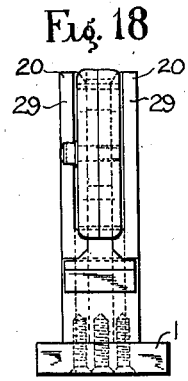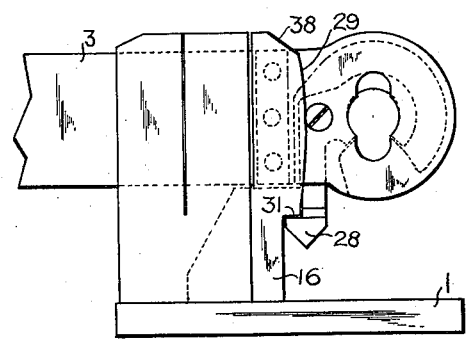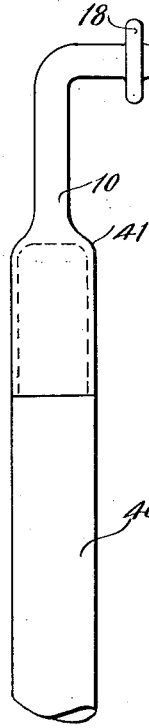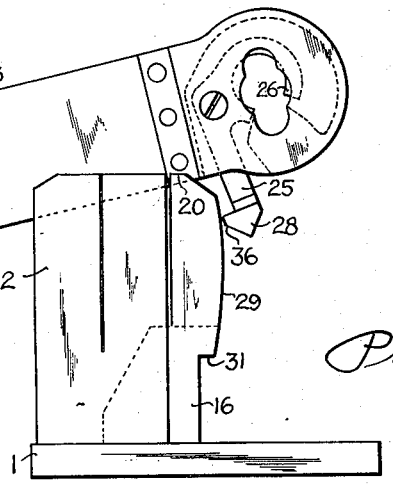

UNITED STATES PATENT OFFICE.

PHILIP H. CHASE, OF EAST ORANGE, NEW JERSEY.

ELECTRIC SWITCH.

1,352,400.　　　　　Specification of Letters Patent.　　Patented Sept. 7, 1920.

Application filed February 28, 1916. Serial No. 80,923.

*To all whom it may concern:*

Be it known that I, PHILIP H. CHASE, a citizen of the United States, and residing at East Orange, in the county of Essex and State of New Jersey, have invented a new and Improved Electric Switch, of which the following specification is a full disclosure.

This invention relates to electric switches, and with regard to certain more specific features, to safety devices for use in connection with manually operated disconnecting-switches for high-voltage circuits.

Among the objects of the present invention may be noted the provision of a practical and effective switch in which the operator cannot remove the operating hook from the switch blade at certain times during the cycle of operation of the switch: the provision of a simple and inexpensive safety device to prevent improper manipulation of a high-voltage switch in the hands of an inefficient or careless operator; the provision of improved apparatus of the above type, of reliable action and durable under conditions of use; and the provision of a switch in which the protective features are effective automatically and the danger of improper handling is reduced to a minimum. Other objects will be in part obvious and in part pointed out hereinafter.

The invention accordingly comprises the features of construction, combinations of elements and arrangements of parts which are to be exemplified in the structure hereinafter described, and the scope of the application of which will be indicated in the following claims.

In the accompanying drawings, in which are shown several of the many possible embodiments of this invention, Figure 1 is a top plan view of a switch in which a fixed shield partially covers or blankets the aperture for the manually operated hook when the switch is only partly closed.

Fig. 8 is a top plan view similar to Fig. 4, except that the blade handle is extended outwardly (away from the blade pivot) and apertured to receive the shield.

Fig. 9 is a side elevation of Fig. 8.

Fig. 10 is an end elevation of Fig. 8.

Fig. 11 is a top plan view similar to Fig. 4, except that the shield blankets the outer part of the aperture, that is, the part farthest from the pivot of the blade.

Fig. 12 is a side elevation of Fig. 11.

Fig. 13 is an end elevation of Fig. 11.

Fig. 14 is a top plan view similar to Fig. 4, with a lock or safety catch to hold the switch in its closed position.

Fig. 15 is a longitudinal sectional elevation on the line 15—15, Fig. 14.

Fig. 16 is a side elevation of Fig. 14.

Fig. 17 is similar to Fig. 16, but shows the switch blade partly open.

Fig. 18 is an end elevation of Fig 14.

Fig. 19 illustrates a preferred form of hook.

Similar reference characters indicate similar parts throughout the several views of the drawings.

In considering the relation of this invention to the prior art, it may be noted that for some time past the users of manually operated switches, especially on high-voltage circuits, have encountered trouble through the failure of the operators to close the switchs completely, or to open them far enough to break any arc that might form. These switches usually comprise simply a pair of spaced and relatively insulated contact-blocks on which are mounted respectively a pivoted switch-blade and a pair of jaw-clips with which the blade contacts when the switch is closed. The blade may be in one or more parts, according to the size of the switch and the preference of the designer. In a double-throw switch, there is an additional contact-block, insulated relatively to the other two, and provided with a pair of jaw-clips to receive the switch blade when the switch is in the second of its two circuit-closing positions. There are a number of varieties of these switches such as double- and triple-pole switches, but it will suffice for the purpose of the present description, to confine the illustrations to a single-pole single-throw switch, it being understood that many if not all of the advantageous features of the present invention are applicable to double-throw, and multiple-pole, and other modifications of the prior-art switching devices.

Figure 1:
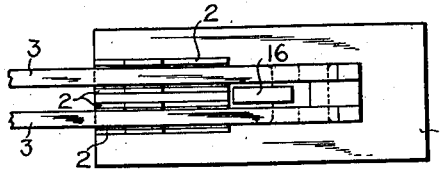
Figure 2:
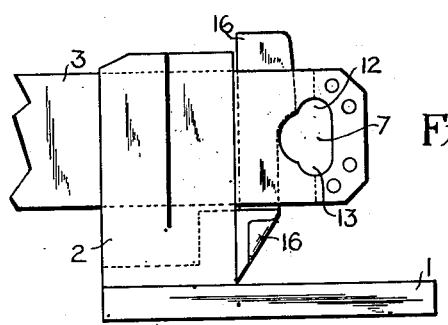
Fig. 2 is a side elevation of Fig. 1.
Figure 3:
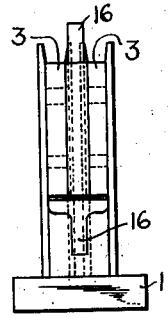
Fig. 3 is an end elevation of Fig. 1.
Figure 4:
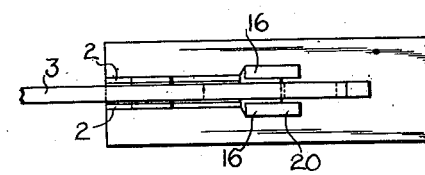
Fig. 4 is a top plan view similar to Fig. 1, of a switch in which the blade is a single bar and the shield has two ears surrounding the bar.
Figure 5:
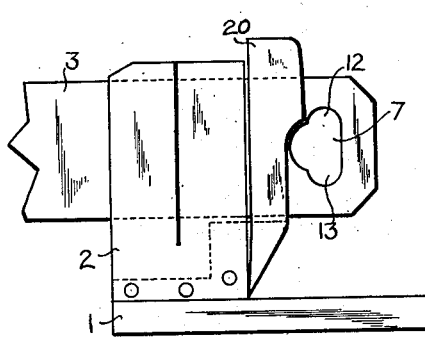
Fig. 5 is a side elevation of Fig. 4.
Figure 7:
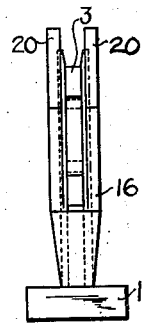
Fig. 7 is an end elevation of Fig. 4.

Referring now more particularly to Figs. 1, 2 and 3 of the drawings, there is illustrated at 1 a base or contact-block upon which are mounted the usual jaw-clips 2 adapted to receive the blade 3, which is pivotally supported upon another contact-block (not shown). The blade 3 is shown as divided in two parts, and there are therefore two pairs of the jaw-clips 2 coöperating therewith when the blade is in its circuit-closing position illustrated more clearly in Fig. 2. When the switch is to be opened, the operator inserts in the aperture 7 in the blade 3 the nose 9 of a hook 10 preferably of the general type illustrated in Fig. 22. The nose 9 passes readily through the large part 11 of the aperture 7, but is too large to pass through the smaller parts 12, 13 of said aperture. The operator, in order to pull the blade 3 away from the jaw-clips 2 to open the switch, pulls in an upward direction on the hook 10; this causes the hook to enter the upper reduced portion 12 of the aperture 7. As soon as the blade begins to open, or a short time after it begins to open, the wide part 15 of the fixed shield 16 so shields or obstructs or blankets the enlarged portion 11 of aperture 7 that the hook cannot be removed from the aperture. By suitably proportioning the parts, it is impossible for the operator, either through accident or carelessness, to remove the hook before he has completely opened the switch by pulling the blade 3 upward until it is entirely out of contact with the jaw-clips 2. The vertical length of the wide portion 15 of the shield 16 determines the range of movement of blade 3 through which the operator is prevented from removing the hook 10: the parts may be so designed as to have this range of movement such that the operator must pull the blade out of contact and then through a further angle to remove any danger of arcing; or the range of movement may be equal to or less than the angular travel of the blade 3 while it is in contact with the jaw-clips 2. In closing the switch, a similar protection is afforded, in that the operator cannot remove the hook until the switch is substantially or entirely closed. The guard 18 on the hook 10 prevents the hook from being inserted too far into the aperture 7. The stationary shield 16 may be mounted on the jaw-clips 2, or on the base 1, or elsewhere, as may be found convenient.

Figure 6:
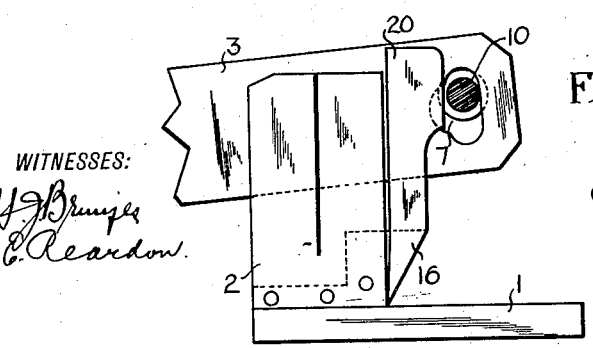
Fig. 6 is similar to Fig. 5, but shows the switch blade partly open.

In the modification illustrated in Figs. 4 to 7, the blade 3 is constructed in a single piece, and the shield 16 is provided with two upstanding ears 20, 20, between which the apertured portion of the blade passes. The operation of this embodiment of the invention is the same as that above set forth in connection with Figs. 1 to 3. In Fig. 6, the switch blade is shown in its partly-closed position, and from this figure it will be clearly seen that the operator is unable to remove the hook 10 from the aperture 7, because the shield 16 blankets the aperture to such an extent that the nose 9 of the hook 10 cannot pass through the unblanketed portion of the aperture.

In Figs. 8 to 10, the blade 3 is shown as constructed of a single piece, as in Figs. 4 to 7, but instead of having the fixed shield 16 provided with upstanding ears 20 surrounding the apertured portion of the blade, the blade is provided with an extension 21 apertured transversely at 7, as in the preceding figures, and further provided with a vertical slot 22 through which the fixed shield 16 passes. This construction would be equally applicable to a blade constructed of two parts, as in Figs. 1 to 3; and it may be generally stated, at this point, that many, if not all, of the several embodiments of the invention herein illustrated may be utilized with each of the various types of switches known in the art. The operation of the device is as above described in connection with Figs. 1 to 3.

In Figs. 11 to 13, the blade 3 is in a single piece, as in Figs. 4 to 7 and 8 to 10, and the blade is provided with a transverse aperture 7, as in Figs. 4 to 7, except that the aperture is so shaped as to coöperate with a fixed shield 16 mounted at the outer side of the aperture, that is, at the side of the aperture farthest from the pivot of the blade 3. The shield 16 is here shown as constructed in a single piece surrounding the outer end of the blade 3; it will be apparent, however, that the shield could be constructed with upstanding ears 20, as illustrated in Figs. 4 to 7. The operation is as above described in connection with Figs. 1 to 3.

In Figs. 14 to 18, the blade 3 is again illustrated as constructed in a single piece, and is provided with a transverse aperture 7, as before. In this case, however, the fixed shield or guide 16 coöperates with the aperture 7 indirectly by guiding a pivoted latch or lock 25 to cause the annular extension 26 thereof to shield or blanket the aperture 7 whenever the catch 28 of the lock 25 abuts against the outer surface 29 of the upstanding ears 20 of the fixed shield 16. When the switch blade 3 is in its closed position, shown in Fig. 15, the catch 28 hooks under the shoulder 31 on the fixed shield 16, and the blade 3 is thus held closed against accidental displacement. The blade or leaf springs 32, 33, tend to press the lock 25 clockwise. In order to open the switch, the operator inserts the nose 9 of the hook 10 into the aperture 7 until the shank 14 of said hook is in said aperture, as in Figs. 1 to 3. The operator then pulls upward on the hook. This rotates the lock 25 counter-clockwise against the action of the springs 32, 33, and as a result the catch 28 shifts toward the right to a position beyond the outer end of the shoulder 31. This unlocks the switch and permits the operator to pull the switch blade upward (counter-clockwise) until the switch is entirely open. Then when he releases the pull on the hook, the leaf springs 32, 33, cause the lock 25 to return clockwise to its position of rest, with the annular portion 26 thereof against the stop surface 35 of the blade 3. The aperture 7 is then the same size as it is in Fig. 15, and the operator can readily remove the hook 10 therefrom. If, however, the operator attempts to remove the hook from the switch blade while the left surface 36 of the catch 28 on the lock 25 engages the outer surface 29 of the fixed shield 16, he will be unable to do so, because the annular extension 26 of the lock 25 will be displaced counter-clockwise about the pivot 27 of said lock, as in Fig. 17, and this counter-clockwise displacement of the lock 25 causes said annular portion 26 thereof to shield or blanket the aperture 7 to such an extent that no part of the aperture is large enough to permit the nose 9 of the hook 10 to pass through it. The operator is thus unable to remove the hook from the switch blade throughout a predetermined range or portion of the movement of the blade, the magnitude of said range depending upon the vertical length of the surface 29 of the shield 16. As indicated above in connection with Figs. 1 to 3, this range of movement of the blade through which the protective device of the present invention is effective, may be varied to any desired extent: the protective device may be made effective from the closed position of the blade to a position considerably beyond the position where contact is actually broken, in order to make sure that any arcing at the contacts is broken prior to disconnection; or the protected range may extend only to the point where contact is actually broken; or the shield 16 may be made shorter, with a corresponding reduction of cost, and the protected range of movement will then extend from the closed position of the switch throughout only part of the angle through which the blade is in contact with the jaw-clips 2. In closing the switch, the catch 28 rides outwardly on the beveled surface 38 of the shield 16, thereby swinging the lock 25 counter-clockwise against the action of springs 32, 33. During the ensuing downward movement of the blade 3, the left surface 36 of the catch 28 rides along the outer surface 29 of the shield 16 until the switch reaches its closed position, at which time the springs 32, 33, swing the catch 28 clockwise until said catch passes under the shoulder 31 of the shield 16, thereby restoring the parts to the relative positions indicated in Fig. 15. As in the preceding figures, the proportioning of the parts, particularly the shape of the aperture 7, is illustrated somewhat conventionally, since the invention is not limited to any particular shape of said aperture, nor, indeed, to any specific arrangement or disposition of parts not inconsistent with the present disclosure.

The hook 10 illustrated in Fig. 22 comprises preferably a wooden or other insulating pole or handle 40, upon which is fitted a ferrule 41, of bronze or other suitable material. This ferrule extends longitudinally of the handle 40 for a short distance, and then transversely of the handle, and the transverse or lateral shank 14 of the ferrule terminates in a nose 9 somewhat larger than the shank but smaller than the aperture 7 of the switch with which the hook is to be used; the shank is preferably provided with a guard 18 larger than the aperture 7, so that the hook cannot be inserted too far in said aperture.

From the above it will be seen that the several objects of the invention are achieved, and other advantageous results obtained.

As various changes might be made in the above construction, and as the above invention might be embodied in different forms, it is intended that all matter set forth in the above description and in the accompanying drawings, shall be interpreted as illustrative and not in a limiting sense.

Having thus revealed my invention, I desire to claim as new and secure by Letters Patent of the United States:

1. An electric switch combining a blade apertured to receive an operating implement, a contact-block, contact clips mounted thereon to coöperate with said blade, and means adjacent the contact clips for preventing removal of the implement during a predetermined range of the movement of the blade.

2. An electric switch combining a blade apertured to receive an operating implement, a contact-block, contact clips mounted thereon to coöperate with said blade, and means comprising a fixed shield adjacent the contact clips for blanketing said aperture throughout a portion of the movement of the blade to an extent sufficient to prevent removal of the implement from said aperture throughout said portion.

3. An electric switch combining a blade member adapted to close a circuit and having an aperture to receive an operating implement, a contact-block, and means comprising a fixed guide adjacent the contact clips for preventing removal of the implement from the blade throughout a portion of the movement of the blade greater than the range of movement of the blade during which the blade closes said circuit.

4. An electric switch combining a blade member adapted to close a circuit and having an aperture to receive a hook provided with a shank and a nose, and means comprising a fixed guide for blanketing said aperture throughout a portion of the movement of said blade to reduce said aperture to a size larger than said shank but smaller than said nose and thus prevent removal of said hook from said aperture throughout said portion of the movement of the blade.

5. An electric switch combining a blade member having an aperture to receive an operating implement, and means comprising a fixed guide extending at one side of said blade member at a point adjacent the contact clips, said means blanketing said aperture throughout a portion of the movement of said blade to prevent removal of said implement from said aperture throughout said portion of the movement of the blade.

6. An electric switch combining a blade member having an aperture to receive a hook provided with a shank and a nose, fixed contact means coöperating with said blade, and means comprising a fixed shield provided with ears extending on either side of said blade member, said means blanketing said aperture throughout a portion of the movement of said blade to reduce said aperture to a size larger than said shank but smaller than said nose and thus prevent removal of said hook from said aperture throughout said portion of the movement of the blade.

7. An electric switch combining a blade member having an aperture to receive an operating implement, fixed contact means coöperating with said blade, and means comprising a fixed shield adjacent to and extending beyond said contact means and said aperture, said means blanketing the outer portion of said aperture throughout a portion of the movement of the blade to an extent sufficient to prevent removal of the implement from said aperture throughout said portion.

8. An electric switch combining a blade member provided with a bracket apertured to receive an operating implement, means for locking said blade in its circuit-closing position, means operated by said implement for releasing said locking means, and means for preventing removal of the implement from said aperture during a predetermined range of the movement of the blade.

9. An electric switch combining a blade member provided with a bracket apertured to receive a hook provided with a nose, a contact-block, contact clips mounted thereon to coöperate with said blade, means for locking said blade in its circuit-closing position, means operated by said hook for releasing said locking means, and means for blanketing said aperture to prevent removal of the hook from said aperture during a predetermined range of the movement of the blade.

10. An electric switch combining a blade apertured to receive an operating implement, means for locking said blade in its circuit-closing position, and means comprising a fixed cam adjacent the contact clips of the blade for preventing removal of the implement from said aperture throughout a portion of the movement of the blade.

11. An electric switch combining a blade apertured to receive a hook provided with a nose, a contact-block, contact clips mounted thereon to coöperate with said blade, means for locking said blade in its circuit-closing position, and means comprising a fixed member adjacent the contact clips blanketing said aperture throughout a portion of the movement of the blade, to an extent sufficient to prevent removal of the hook from said aperture throughout said portion.

12. An electric switch combining a blade member having an aperture to receive an operating implement, fixed contact means coöperating with said blade, means adjacent said contact means for locking said blade in its circuit-closing position, means operated by the implement for releasing said locking means and simultaneously blanketing said aperture to an extent sufficient to prevent the removal of the implement from said aperture, and means for retaining said locking means in said blanketing position throughout a predetermined portion of the range of movement of the blade to prevent removal of the implement from said aperture throughout said portion.

13. An electric switch combining a blade member having an aperture to receive a hook provided with a shank and a nose, fixed contact means coöperating with said blade, a fixed guide provided with ears extending on either side of said blade member, means for locking said blade in its circuit-closing position, means operated by said hook for releasing said locking means and simultaneously blanketing said aperture to reduce said aperture to a size larger than said shank but smaller than said nose, to prevent removal of said hook from said aperture, said ears maintaining said locking means in said blanketing position throughout a predetermined range of the movement of the blade.

14. An electric switch combining a blade member having an aperture to receive an operating implement, a guide provided with ears extending on either side of said blade member, means for locking said blade in its circuit-closing position, means operated by said implement for releasing said locking means and blanketing said aperture to prevent removal of said implement from said aperture, said ears maintaining said locking means in said blanketing position throughout a predetermined range of the movement of the blade.

15. An electric switch combining a blade having an aperture to receive an operating implement, fixed contact means coöperating with said blade to close a circuit, a member fixed on said contact means and provided with a shoulder, a latch pivotally mounted on said blade and having a catch coöperating with said shoulder to lock the blade in its circuit-closing position, means tending to maintain said latch in its locking position, and an extension on said latch partially blanketing said aperture, whereby when said implement is inserted in said aperture the initial movement of the implement in the direction for opening the switch forces said catch away from said shoulder to unlock said blade, said member coöperating with said latch to prevent removal of the implement throughout a predetermined portion of the movement of the blade.

16. An electric switch combining a pivoted blade having an aperture to receive a hook provided with a shank and a nose, a fixed contact-block, contact clips mounted thereon to coöperate with said blade to close a circuit, a fixed guide mounted on said contact-block and provided with a shoulder, a latch pivotally mounted on said blade and having a catch coöperating with said shoulder to lock the blade in its circuit-closing position, springs tending to maintain said latch in its locking position, an extension on said latch partially blanketing said aperture, a second extension adapted to partially blanket said aperture upon rotation of the latch, whereby when said hook is inserted in said aperture the initial movement of the hook in the direction for opening the switch forces said catch away from said shoulder to unlock said blade and simultaneously blankets said aperture to an extent sufficient to prevent removal of the hook from said aperture, said guide coöperating with said latch to maintain said latch in said blanketing position throughout a predetermined portion of the movement of the blade to prevent removal of the hook from said aperture until the blade has been moved through a predetermined angle in its circuit-opening direction of movement and likewise preventing removal of the hook from said aperture during the closing movement of the switch prior to the completion of the closing movement and the locking of the catch against the shoulder.

17. An electric switch comprising a pair of posts, a switch blade pivotally connected to one of the posts, a catch lug secured to the other post, switch jaws adjacent said catch lug, a bracket secured to the blade, and a latch pivotally connected to the bracket, said bracket being at such distance from the pivot of the blade as to cause the latch to coact with the catch lug when the blade is closed, said bracket having an eye to be engaged by an operating implement, and the latch having an ear overlapping said eye, and means effective throughout a predetermined range of the movement of the blade, for preventing removal of the implement from the bracket.

18. An electric switch comprising a switch blade, a guide provided with a catch lug, switch jaws adjacent said catch lug, a bracket secured to the blade, and a latch pivotally connected to the bracket, said bracket being at such distance from the pivot of the blade as to cause the latch to coact with the catch lug when the blade is closed, said bracket having an eye to be engaged by an operating implement, the latch overlapping said eye when the latch is in locking position and in unlocking position and in the latter position preventing the removal of the implement, the guide maintaining the latch in unlocking position throughout a predetermined range of the movement of the blade.

19. An electric switch combining a blade having at its outer end, beyond the jaw clips, an aperture for the reception of an operating implement, a pivoted latch mounted on said blade adjacent said aperture and having a portion extending into said aperture, a fixed shield adjacent the jaw clips and provided with a catch coöperating with the latch to lock the blade in closed position, the initial movement of the implement in the aperture in a blade-opening direction serving to unlock the latch.

20. An electric switch combining a blade having at its outer end beyond the jaw clips, an aperture therein for the reception of an operating implement, a locking device having a pivoted portion on the blade and a fixed catch adjacent the jaw clips, and means whereby the initial movement of the implement swings the pivoted portion to unlock the blade and permit it to be opened.

In witness whereof, I hereunto subscribe my name, as attested by the two subscribing witnesses.

PHILIP H. CHASE.

Witnesses:
 DELOS G. HAYNES,
 JOHN F. RULE.